United States Patent
Kasai et al.

[11] Patent Number: 5,746,960
[45] Date of Patent: May 5, 1998

[54] METHOD OF MANUFACTURING POWDER INJECTION MOLDED PART

[75] Inventors: Takao Kasai, Saitama; Kenichi Yoshikawa, Tokyo; Shigeru Saito, Saitama; Masami Hoshi, Tokyo, all of Japan

[73] Assignee: Citizen Watch Co., Ltd., Tokyo, Japan

[21] Appl. No.: 681,315

[22] Filed: Jul. 22, 1996

Related U.S. Application Data

[63] Continuation of Ser. No. 325,355, filed as PCT/JP93/00288, Mar. 9, 1993, published as WO94/20242, Sep. 15, 1994, abandoned.

[51] Int. Cl.$^6$ .................................................. B29C 71/00
[52] U.S. Cl. ........................... 264/234; 264/669; 264/670
[58] Field of Search ................................... 264/669, 670, 264/234

[56] References Cited

U.S. PATENT DOCUMENTS

| | | | |
|---|---|---|---|
| 4,305,756 | 12/1981 | Weich, Jr. ................... | 75/211 |
| 4,530,808 | 7/1985 | Renlund et al. ............. | 264/63 |
| 4,597,926 | 7/1986 | Ando et al. .................. | 264/67 |
| 4,765,950 | 8/1988 | Johnson ....................... | 419/2 |
| 5,009,841 | 4/1991 | Bloemacher et al. ........ | 419/23 |
| 5,021,208 | 6/1991 | Lugwig et al. ............... | 264/344 |
| 5,051,062 | 9/1991 | Ando et al. .................. | 416/241 B |
| 5,380,179 | 1/1995 | Nishimura et al. .......... | 419/36 |

FOREIGN PATENT DOCUMENTS

| | | |
|---|---|---|
| 0379777 | 8/1990 | European Pat. Off. . |
| 36 11 271 | 10/1987 | Germany . |

*Primary Examiner*—Christopher A. Fiorilla
*Attorney, Agent, or Firm*—Flynn, Thiel, Boutell & Tanis, P.C.

[57] ABSTRACT

This manufacturing method of a powder injection molded part includes the steps of using a binder composition containing at least 2 kinds of thermoplastic binder components having an evaporation temperature higher than the injection molding temperature and a different evaporation initiating temperature from each other, elevating the temperature of a molded body above the evaporation initiating temperature of the binder component having the lowest evaporation initiating temperature rapidly, removing the binder component having the lowest evaporation initiating temperature from the molded body by holding this temperature, and thereafter, removing all binder components by elevating up to a temperature not lower than the evaporation initiating temperature of the binder component having the highest evaporation initiating temperature. By this method, the form unstability of final parts, which is a problem of the prior art, is resolved, dimensional accuracy is satisfied, and it is possible to shorten debinding times.

5 Claims, 2 Drawing Sheets though chemical reaction occurs and physical change cannot be avoided. Moreover, it is necessary to consider that, when a binder component which decomposes at a temperature not higher than its injection molding temperature is selected among binder components, the binder content of molded bodies scatters in the molding process resulting in the occurrence of scattering of the sintered body size. In addition, it is also necessary to consider fluidized state preceding the decomposition of binder components, and to keep melted state for a long time

METHOD OF MANUFACTURING POWDER INJECTION MOLDED PART

This application is a continuation of U.S. Ser. No. 08/325,355, filed as PCT/JP93/00288, Mar. 9, 1993 published as WO94/20242, Sep. 15, 1994, now abandoned.

TECHNICAL FIELD

This invention relates to a method of manufacturing parts by powder injection molding, and more particularly, relates to a method of removing binder from a molded body during manufacture of the part by the above manufacturing method.

BACKGROUND ART

Powder injection molding is a method capable of producing parts having a three-dimensional complicated form accurately as well as efficiently. Characteristics of this manufacturing method are in the introduction of the injection molding method used for plastic into conventional powder metallurgy. Compared with conventional powder metallurgy, this method requires a large quantity of binder and a binder having a low viscosity at high temperature is used. Accordingly, the result of the debinding process for removing this influences the quality and productivity of the method. Thereupon, the binder used in powder injection molding must satisfy the high fluidity requirements of powder-binder complexes required in the injection molding process, and must satisfy debinding rate and shape retention requirement in the debinding process. Particularly, low melting point binder, such as carnauba wax, paraffin wax, polyethylene wax and stearic acid, is essential for a binder composition for powder injection molding, because of not only improving the uniform filling ability of a complex form part due to the improvement in fluidity in the injection molding process, and exercising an excellent effect of demolding from a forming mold, but also not varying the blended amount of binder in a molded body due to its high evaporation point. However, the method of removing waxes, which are low melting components, from a powder injection molded body efficiently without forming defects was accompanied with difficulties.

As the debinding method of injection molded parts, vacuum dewaxing and solvent extraction have been proposed in addition to conventional thermal decomposition. However, these methods are unsatisfactory because of having a problem in equipment cost, productivity, safety and quality, and the thermal decomposition still occupies the main current.

As a thermal decomposition method, Japanese Patent KOKAI 51-25507 discloses a method of removing organic binder components without inducing physical change by decomposing the components by a stepwise temperature elevation corresponding to the components. However, even in this method, unless a debinding atmosphere is selected so that the reaction with binder and binder decomposed gas does not occur, it is impossible to shorten the debinding process sufficiently, because chemical reaction occurs and physical change cannot be avoided. Moreover, it is necessary to consider that, when a binder component which decomposes at a temperature not higher than its injection molding temperature is selected among binder components, the binder content of molded bodies scatters in the molding process resulting in the occurrence of scattering of the sintered body size. In addition, it is also necessary to consider fluidized state preceding the decomposition of binder components, and to keep melted state for a long time must be avoided because of especially promoting deformation of debinded body.

As a dewaxing method which is an improvement over conventional thermal decomposition dewaxing method, Japanese Patent KOKOKU 61-48563 proposes a method of obtaining a dewaxed body without defects by using two or more kinds of binders having a different melting point, and introducing a process wherein a molded body is put on an absorber, and the lowest melting point binder is first fluidized by elevating the temperature from ordinary temperature to be absorbed by the absorber. Besides, U.S. Pat. No. 4,404,166 proposes a binder-removing method by elevating temperature up to not higher than the melting point of the highest melting point binder component for some time subsequent to the aforementioned process. However, the problem of these debinding methods is not only that the time of the debinding process is too long, but also that two points, i.e. dimensional stability in sintering and dewaxed shape retention, are inferior. That is, when the lowest melting point binder moves in a melted state on the inside of a molded body toward the absorber of the binder, particulate materials in a mixed state with the binder move in the gravity direction, i.e. the absorber direction resulting in the occurrence of density difference in the thickness direction at the finish of dewaxing. The density difference appears as the difference of contraction coefficient in the thickness direction at the finish of sintering process resulting in the occurrence of warpage in a sintered body. Moreover, since there is a limit to the rate of absorbing the low melting point binder component by the absorber, the melted low melting point binder component is enriched in the vicinity of a debinding plate which sharply decreases the strength of the molded body. As a result, in the case of a molded body having a recessed form on the contact face side, distinct deformation is formed by the self weight of a part at the finish of the debinding process. Besides, when the maximum temperature in the debinding process is stopped at not higher than the melting point of the highest melting point binder component, the highest melting point binder component is likely to remain and degrade the quality of a sintered body.

As mentioned above, it is difficult to obtain a sintered part satisfying dimensional accuracy requirements by powder injection molding by applying a debinding method according to the prior art.

An object of the invention is to provide a method of manufacturing a powder injection molded part capable of resolving the form unstability of final parts, which is a problem of the aforementioned prior art, satisfying dimensional accuracy, and shortening debinding time.

DISCLOSURE OF INVENTION

The present invention provides a method of manufacturing a powder injection molded part which has achieved the above object, and the manufacturing method comprises using a binder composition comprising at least 2 kinds of thrmoplastic binder components having an evaporation temperature higher than the injection molding temperature and a different evaporation initiating temperature from each other, elevating the temperature of a molded body above the evaporation initiating temperature of the binder component having the lowest evaporation intiating temperature rapidly, removing the binder component having the lowest evaporation initiating temperature from the molded body by maintaining this temperature, and thereafter, removing all binder components by elevating the body temperature up to a temperature not lower than the evaporation initiating temperature of the binder component having the highest evaporation initiating temperature.

BEST MODE FOR CARRYING OUT THE INVENTION

Figure 1:
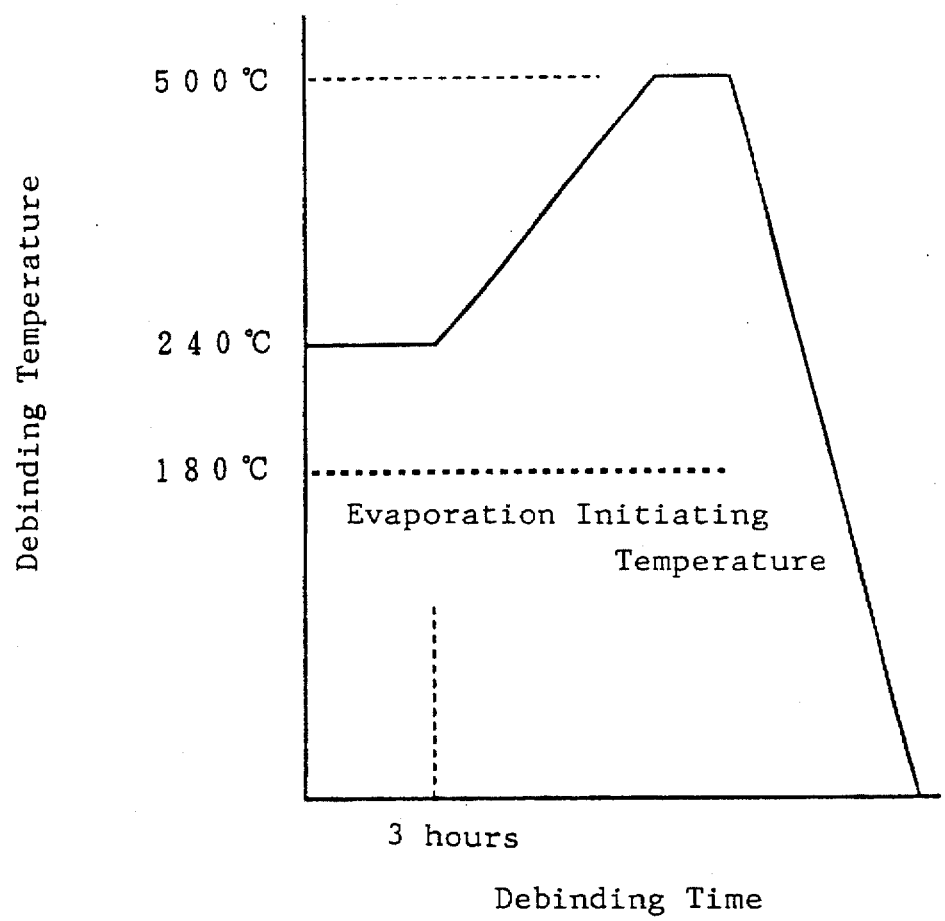
FIG. 1 is a graph indicating debinding temperature changes plotted against debinding time in an example of the invention.

The molded body to which the invention is applied is formed of powder, binder and additives which are optionally added.

The powder is powder of a metal, ceramic or the like. The metal is Fe, an iron based alloy, such as Fe—Ni, Fe—Co, Fe—Si or Fe—Ni—Cr, a Co based alloy, such as Co—Fe—V, a W based alloy, such as W—Ni—Cu, a copper based alloy, such as Cu—Ni, Cu—Sn, Ti, a Ti based alloy, such as TiAl, a carbide based alloy, such as WC—Co, or the like, and the ceramic is an oxide based ceramic, such as alumina based, zirconia based, barium titanate based or calcium titanate based, a non-oxide ceramic, such as aluminum nitride, silicon nitride or silicon carbide based, ferrite or the like. The particle size of the powder is about 0.3 to 30 μm, preferably 0.5 to 20 μm, as the mean particle size.

The binder is composed of a composition containing at least 2 kinds of thermoplastic binders having evaporation initiating temperatures different from each other. The evaporation initiating temperature is the temperature of initiating a remarkable evaporation loss in the analytical method using a thermobalance. In the case that the binder is a polymer material, the evaporation occurs by thermal decomposition. Among respective binder components, a suitable evaporation initiating temperature of that having the lowest evaporation initiating temperature is about 150° to 280° C., preferably about 180° to 220° C., and a suitable evaporation initiating temperature of that having the highest evaporation initiating temperature is about 250° to 400° C., preferably about 300° to 350° C. The number of the binder components in the composition and the blending rate are set so that the removal of the binder is preferably continuously conducted at a constant speed according to the temperature rise in the debinding process. A suitable number of the binder components is about 2 to 5, preferably about 2 to 3. The blending rate of the binder components varies according to the complexity of form and size of the part, particle size and specific surface area of raw powder to be used, and is set so as to satisfy the requirements of uniform moldability, debinding shape retention and the like, and accordingly, it cannot be prescribed equally. As examples of the thermoplastic binder, there are paraffin wax, carnauba wax, montan wax, microcrystalline wax, polyethylene wax, alpha olefin wax, atactic polypropylene, ethylene-vinyl acetate copolymer, polyethylene, polypropylene, ethylene-acrylate copolymer, polystyrene, polyacrylate esters, polymethacrylate esters, polyamide, polyacetal, and the like.

As the additives which are optionally added, there are stearic acid and stearic amides as lubricants, and they can also unction as the binder. As plasticizers, there are phthalate esters.

The blending ratio in an injection molded body is about 30 to 60 parts by volume of the binder per 100 parts by volume of the powder, and a minimum binder amount is desirable which satisfies the quality requirements in the injection molding process. The amount of the additives which are optionally added is about 0 to 10 parts by volume.

When the injection molded body is debinded, the temperature of the molded body is elevated rapidly up to above the evaporation initiating temperature of the binder component having the lowest evaporation initiating temperature. As the temperature, a suitable temperature is not lower than the above evaporation initiating temperature and not higher than the evaporation initiating temperature of the binder component having the second lowest evaporation initiating temperature. The temperature rise speed up to this temperature may be any speed not giving damage to the injection molded body, and usually, the temperature may be elevated without special consideration.

Then, the binder component having the lowest evaporation initiating temperature is removed from the molded body by maintaining this temperature. The temperature to be maintained is not necessarily constant but may be present in the above temperature range. In the case that there are 3 or more kinds of binder components, the method of evaporating 2 kinds of the binder components among them at first is included in the method of the invention. In this case, the temperature to be maintained is set at not lower than the evaporation initiating temperature of the binder component having the second lowest evaporation initiating temperature and not higher than the evporation initiating temperature of the binder component having the third lowest evaporation initiating temperature.

By elevating the temperature of the injection molded body rapidly up to immediately above the evaporation initiating temperature of the binder having the lowest evaporation initiating temprature and then maintaining this temperature, the lowest evaporation initiating binder is evaporatively removed from the surface of the molded body without moving in the dewaxing plate direction. By shortening the time the binder is in a melted state prior to the initiation of evaporation, the migration of powder particles becomes extremely low, and scattering of density difference formed in the thickness direction can be prevented. It is also included in the present invention to elevate the temperature gradually up to the remarkable evaporation temperature of the binder having the second lowest evaporation initiating temperature from the lowest evaporation temperature instead of maintaining the lowest temperature.

Subsequently, the debinding temperature is further elevated to remove all residual binder components. The temperature elevating speed is a speed which does not generate cracks or blisters in the molded body, and it varies according to the kind and quantity of binder components, particle size of powder, form, size of the molded body and the like, and in usually, temperature elevation of about 5° to 50° C./hour is possible. The temperature elevation may be continuous or stepwise. In the latter case, it is possibly set so that evaporation of each binder component is finished in sequence of lower evaporation initiating temperature.

It is preferable that the above debinding process is conducted as endothermic reaction in an atmosphere inert to both binder components and thermal decomposition products thereof. As such an atmosphere, a gas atmosphere inert to the binder in the debinding temperature region, such as nitrogen gas, helium, hydrogen or argon can be used. In so far as conducting the rapid temperature elevation up to immediately above the evaporation initiating temperature of the binder and keeping in a gas atmosphere inert to the binder, defects, such as blisters and cracks do not occur in the molded body. However, when debinding is conducted in an oxidizing atmosphere, heat is generated from the surface of the molded body by the oxidation reaction of the binder and binder decomposition products to form defects on the inside. Accordingly, in a debinding method conducted in an oxidizing atmosphere, heat generation occurs by the oxidation of the binder. As a means for avoiding the occurrence of defects by heat generation, although the method disclosed in Japanese Patent KOKOKU 61-48563 is effective, the effect on shortening time satisfactorily is small.

After debinding, sintering is conducted according to a known method to obtain a sintered body.

EXAMPLE

To 100 parts by weight of calcium titanate powder (CaO/TiO$_2$=0.63) having a mean particle size of 0.9 μm and a specific surface area of 4.5 m$^2$/g, 21.0 parts by weight of the binder shown in Table 1 was added. After kneading by a kneader at 150° C., a compound for injection molding was prepared by a granulating machine. The composition of the binder was as follows:

| | |
|---|---|
| Low density polyethylene | 42 wt. % |
| Atactic polyolefin | 12 wt. % |
| Ethylene-vinyl acetate copolymer | 36 wt. % |
| Polystyrene | 10 wt. % |

TABLE 1

| | Evaporation (decomposition) loss initiating temperature in nitrogen atmosphere |
|---|---|
| Low density polyethylene | 180° C. |
| Atactic polyolefin | 240° C. |
| Ethylene-vinil acetate copolymer | 300° C. |
| Polystyrene | 320° C. |

Figure 2:
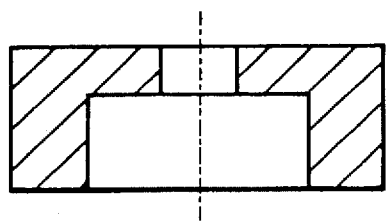
FIG. 2 is a sectional view indicating a molded body used in this example.

Using the above compounds, a disc-formed molded body shown in FIG. 2 was prepared at an injection molding temperature of 135° C. The molded body has a size of 15 mm in diameter and 5 mm in height, and has a form of short pipe of which the top is closed by a disc. The thickness of the short pipe portion is 4 mm, and a circular hole 5 mm in diameter is provided at the center of the disc. The molded body was put on an alumina plate having a relative density of 95%, and put in a debinding furnace previously heated at 240° C., by considering the evaporation condition of low density polyethylene having the lowest evaporation temperature in the binder and the evaporation condition of atactic polyolefin which is next decomposed to evaporation from the molded body. Since it was comfirmed that 100% of the low density polyethylene in the molded body had been removed by maintaing it at 240° C. for 2.5 hours, the temperature was elevated to 500° C. for 13 hours. After confirming that the binder in the molded body was at least 99.5% removed by maintaining it at 500° C. for 2 hours, it was cooled rapidly to room temperature. Although the size of the debinded body was contracted by 0.2%, defects such as cracks and blisters did not occur. The deformation in the diameter direction (difference in size in X-Y direction) was not more than 10 μm. The interface of the plate and the debinded body was normal, and defects such as collapse of the molded body could not been found. The debinded body was transferred to an oxidizing atmosphere furnace, and sintered at 1290° C. for 2 hours. The density of the sintered body was 3.98, and the linear contraction coefficient was 18.7%. Deformation was very small, and there was no scattering in each size.

COMPARATIVE EXAMPLE

Figure 3:
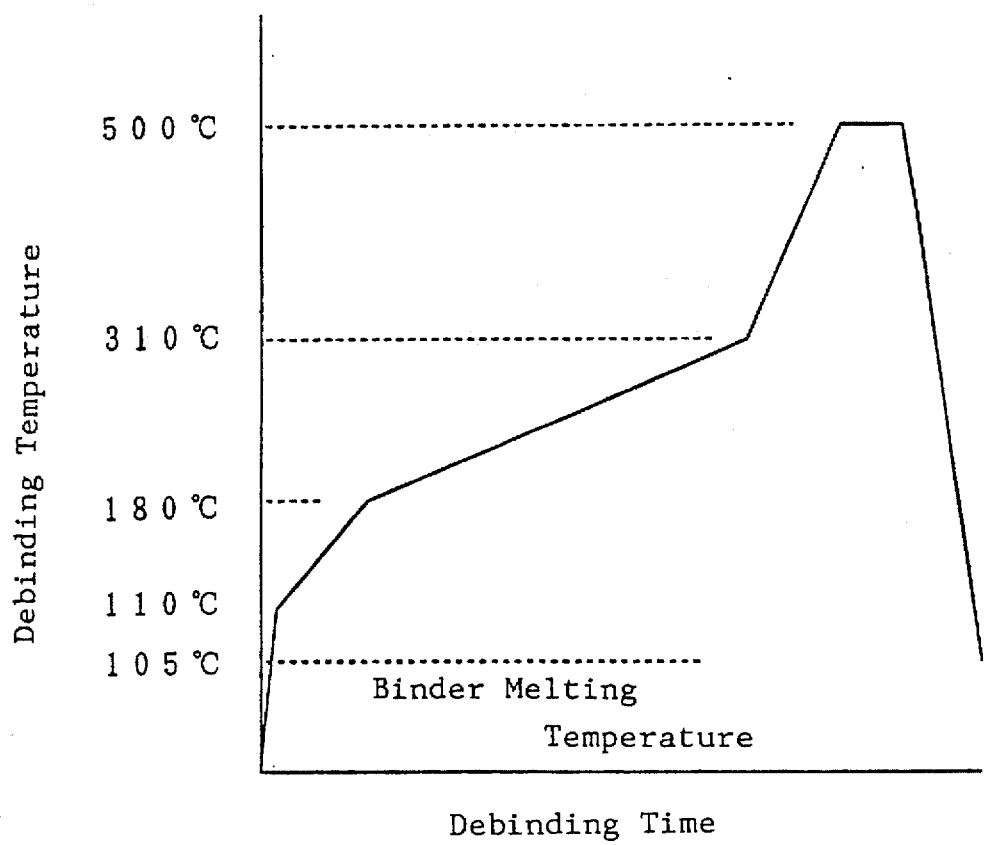
FIG. 3 is a graph indicating debinding temperature changes plotted against debinding time in a comparative example.
Figure 4:
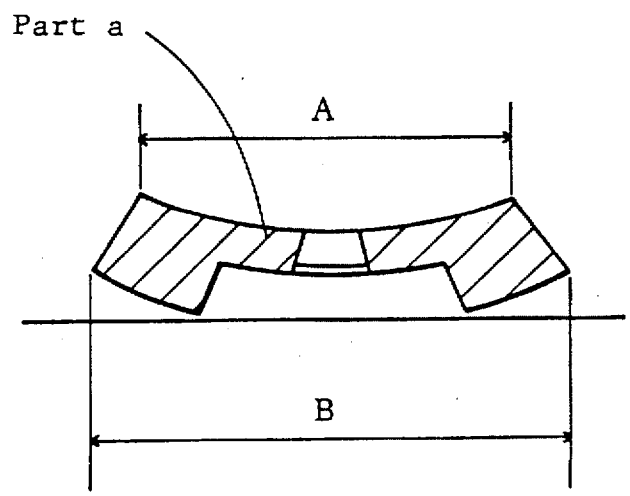
FIG. 4 is a sectional view indicating the deformed state of a molded body debinded in the comparative example.

The molded body used in the example was, as shown in FIG. 3, rapidly heated from room temperature up to immediately above the temperature of 105° C., which was a softening point of low density polyethylene examined by thermal analysis, for 0.5 hour, the temperature was elevated to the evaporation temperature of 180° C. for 2 hours, and the temperature was elevated from 180° C. to 310° C. immediately under the evaporation temperature of the binder having the highest evaporation temperature. The dewaxed rate up to this step was low, i.e. 88%, and the occurrence of defects during sintering was anxious. Accordingly, the temperature was elevated to 500° C. for 5 hours and held for 2 hours. As a result, the dewaxed rate became 99%. The debinded body was observed in detail, and a sag deformation in the gravity direction was found at part a in FIG. 4. The interface of the plate and the debinded body was swelled, and adhesion of calcium titanate powder to the plate was found. The debinded body was sintered in a method similar to the Example. As a result, the sintered density was satisfied and defects such as cracks and blisters did not occur. However, the warpage deformation shown in FIG. 4 occurred which did not appear in the debinded state.

As a result of measuring size, it was found by the measurement of A, B sizes that the contraction coefficient was different between the contact face with the plate and the non-contact face.

INDUSTRIAL APPLICABILITY

The powder injection molded part method of the invention can be applied widely to metal, cermet, and ceramic products.

We claim:

1. A method of manufacturing a powder injection molded part comprising the steps of: forming a molded green body comprising a binder composition containing at least two different thermoplastic binder components, said binder components having an evaporation temperature higher than the temperature at which injection molding is conducted and thermal decomposition evaporation initiation temperatures that are different from each other; heating the green body to a first temperature above the thermal decomposition evaporation initiation temperature of the binder component having the lowest thermal decomposition evaporation initiation temperature at such a rate that the binder component having the lowest thermal decomposition evaporation initiation temperature evaporates from a molten state without downward flow of the molten binder component; removing the binder component having the lowest thermal decomposition evaporation initiation temperature from the molded body by endothermic thermal decomposition in an atmosphere which is inert to all the binder components and their thermal decomposition products by maintaining the molded body at the first temperature; and heating the molded body to a second temperature not lower than the thermal decomposition evaporation initiation temperature of the binder component having the highest thermal decomposition evaporation initiation temperature to remove the remaining binder components from the molded body, wherein the lowest thermal decomposition initiation temperature is in the range of 150° to 280° C., the highest thermal decomposition initiation temperature is in the range of 250° to 400° C. and the second temperature is higher than the first temperature.

2. The method of claim 1, wherein said thermoplastic binder components are thermoplastic resins.

3. The method of claim 1, wherein the lowest thermal decomposition evaporation initiation temperature is in the range of 180° to 220° C.

4. The method of claim 1, wherein the highest thermal decomposition evaporation initiation temperature is in the range of 300° to 350° C.

5. The method of claim 1, wherein the removal of the binder components is conducted in a debinding furnace heated to a temperature higher than the thermal decomposition evaporation initiation temperature of the binder component having the lowest thermal decomposition evaporation initiation temperature.

\* \* \* \* \*